(12) United States Patent
Cihla et al.

(10) Patent No.: US 7,689,708 B1
(45) Date of Patent: Mar. 30, 2010

(54) APPARATUS TO FLOW CONTROL FRAMES IN A NETWORKED STORAGE VIRTUALIZATION USING MULTIPLE STREAMING PROTOCOLS

(75) Inventors: James L. Cihla, San Jose, CA (US); Jeff Cuppett, Los Altos, CA (US); Rahim Ibrahim, Mountain View, CA (US)

(73) Assignee: netApp, inc., Sunnyvale, CA (US)

( * ) Notice: Subject to any disclaimer, the term of this patent is extended or adjusted under 35 U.S.C. 154(b) by 1892 days.

(21) Appl. No.: 10/690,924

(22) Filed: Oct. 21, 2003

Related U.S. Application Data

(60) Provisional application No. 60/422,109, filed on Oct. 28, 2002.

(51) Int. Cl.
   G06F 15/16 (2006.01)
   H04L 12/24 (2006.01)
(52) U.S. Cl. .................. 709/235; 370/235; 370/231; 370/230.1
(58) Field of Classification Search ............... 709/235; 370/235, 231, 230.1
   See application file for complete search history.

(56) References Cited

U.S. PATENT DOCUMENTS

| | | | |
|---|---|---|---|
| 5,682,537 A | 10/1997 | Davies et al. | |
| 5,960,434 A | 9/1999 | Schimmel | |
| 6,084,877 A | 7/2000 | Egbert | |
| 6,233,242 B1 | 5/2001 | Mayer | |
| 6,249,521 B1 | 6/2001 | Kerstein | |
| 6,343,339 B1 | 1/2002 | Daynes | |
| 6,657,962 B1 * | 12/2003 | Barri et al. | 370/235 |
| 6,721,320 B1 | 4/2004 | Hoglund | |
| 6,757,769 B1 | 6/2004 | Ofer | |
| 6,915,296 B2 | 7/2005 | Parson | |
| 6,965,893 B1 | 11/2005 | Chan et al. | |
| 7,069,268 B1 | 6/2006 | Burns | |
| 2003/0084268 A1 | 5/2003 | Mashima | |
| 2003/0115355 A1 * | 6/2003 | Cometto et al. | 370/230.1 |
| 2003/0123455 A1 * | 7/2003 | Zhao et al. | 370/428 |
| 2004/0006572 A1 | 1/2004 | Hoshino et al. | |
| 2004/0068607 A1 | 4/2004 | Narad | |
| 2004/0199734 A1 | 10/2004 | Rajamani et al. | |

* cited by examiner

*Primary Examiner*—Jungwon Chang
(74) *Attorney, Agent, or Firm*—Wiesner and Associates; Leland Wiesner

(57) ABSTRACT

A storage server includes various components that monitor and control the data flow therebetween. If an egress (downstream) port becomes congested, that information is propagated upstream to the egress components such as the port manager, the traffic manager processor, and the egress storage processor, which are each configured to control their data flow to prevent dropped data frames. In addition, the egress storage processor can communicate the congestion information to the ingress storage processor, which further propagates the congestion information to the ingress components such as the traffic manager processor and the port manager processor. The ingress port manager processor can then direct the ingress port to stop accepting ingress data for the storage server to process until the congestion has been addressed.

19 Claims, 5 Drawing Sheets

APPARATUS TO FLOW CONTROL FRAMES IN A NETWORKED STORAGE VIRTUALIZATION USING MULTIPLE STREAMING PROTOCOLS

CROSS-REFERENCES TO RELATED APPLICATIONS

The present application claims priority to U.S. Provisional Application No. 60/422,109 titled "Apparatus and Method for Enhancing Storage Processing in a Network-Based Storage Virtualization System" and filed Oct. 28, 2002, which is incorporated herein by reference.

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

FIG. 1 is a block diagram of a storage area network (SAN) system 10. The SAN system 10 includes a host 12, a network 14, a storage server 16, and a storage system 18. The host 12 generally includes a computer that may be further connected to other computers via the network 14 or via other connections. The network 14 may be any type of computer network, such as a TCP/IP network, an Ethernet network, a token ring network, an asynchronous transfer mode (ATM) network, a Fibre Channel network, etc. The storage system 18 may be any type of storage system, such as a disk, disk array, RAID (redundant array of inexpensive disks) system, etc.

The storage server 16 generally transparently connects the host 12 to the storage system 18. More specifically, the host 12 need only be aware of the storage server 16, and the storage server 16 takes responsibility for interfacing the host 12 with the storage system 18. Thus, the host 12 need not be aware of the specific configuration of the storage system 18. Such an arrangement allows many of the storage management and configuration functions to be offloaded from the host.

Such offloading allows economies of scale in storage management. For example, when the storage system 10 has multiple hosts on the network 14 and the components of the storage system 18 are changed, all the hosts need not be informed of the change. The change may be provided only to the storage server 16.

Similar concepts may be applied to other storage system architectures and arrangements such as networked attached storage (NAS), etc.

One concern with storage servers is that data not be dropped. However, if the storage server 16 fails to adequately monitor congestion, the storage server 16 may become overloaded and have to drop new data in order to continue processing the existing data. Such dropped data results in increased network traffic because the host may be required to re-submit storage requests that were dropped.

It is a goal of the present invention to reduce the need to drop data when the data is being processed by a storage server.

BRIEF SUMMARY OF THE INVENTION

As described above, egress port contention and buffer exhaustion are problems present in many storage servers. In one type of storage server, the presence of congestion on a single egress port affects all ports attached to that storage server. If the egress port congestion lasts long enough, the egress buffer on the affected storage server will become exhausted and frames will be discarded in either the egress buffer or the ingress buffer. Ingress buffer exhaustion affects not only frames destined for the congested storage server, but also frames that were to be looped back out the same storage server. The present invention is directed toward improving flow control of frames to reduce the chance that frames must be discarded.

The present invention is directed toward detecting congestion in a storage server and controlling the data flow through the components of the storage server in response to the congestion. Numerous buffers may be used to store data in order to reduce the data flow to upstream or downstream components that may have the congestion. By controlling the data flow when the congestion is detected, the possibility is reduced that the storage server drops data frames.

In general, embodiments of the present invention include numerous components along the data flow path. The components individually control the data flow through each component. In addition, the components communicate with other components in order to further control the data flow. Such a combination of control greatly reduces the chance that data frames would be dropped.

According to one embodiment of the present invention, a method controls the data flow to reduce congestion in a server. The server has ingress ports and egress ports. The method includes detecting congestion in the data flow through a first component of the server, wherein the first component is coupled to one of the ports. The method further includes controlling the data flow through the first component in response to the detected congestion. The method further includes sending a signal from the first component to a second component of the server in response to the congestion. The method further includes controlling the data flow through the second component in response to the signal.

According to another embodiment of the present invention, an apparatus includes a server for reducing data flow congestion when processing data between devices connected via a network. The server includes various components including ports, port manager processors, traffic manager processors, and storage processors. The components detect congestion, control the data flow in response to the congestion, and inform other components of the congestion. In this manner, the components work together to avoid dropping frames.

A more detailed description of the embodiments of the present invention is provided below with reference to the following drawings.

DETAILED DESCRIPTION OF THE INVENTION

Figure 2:
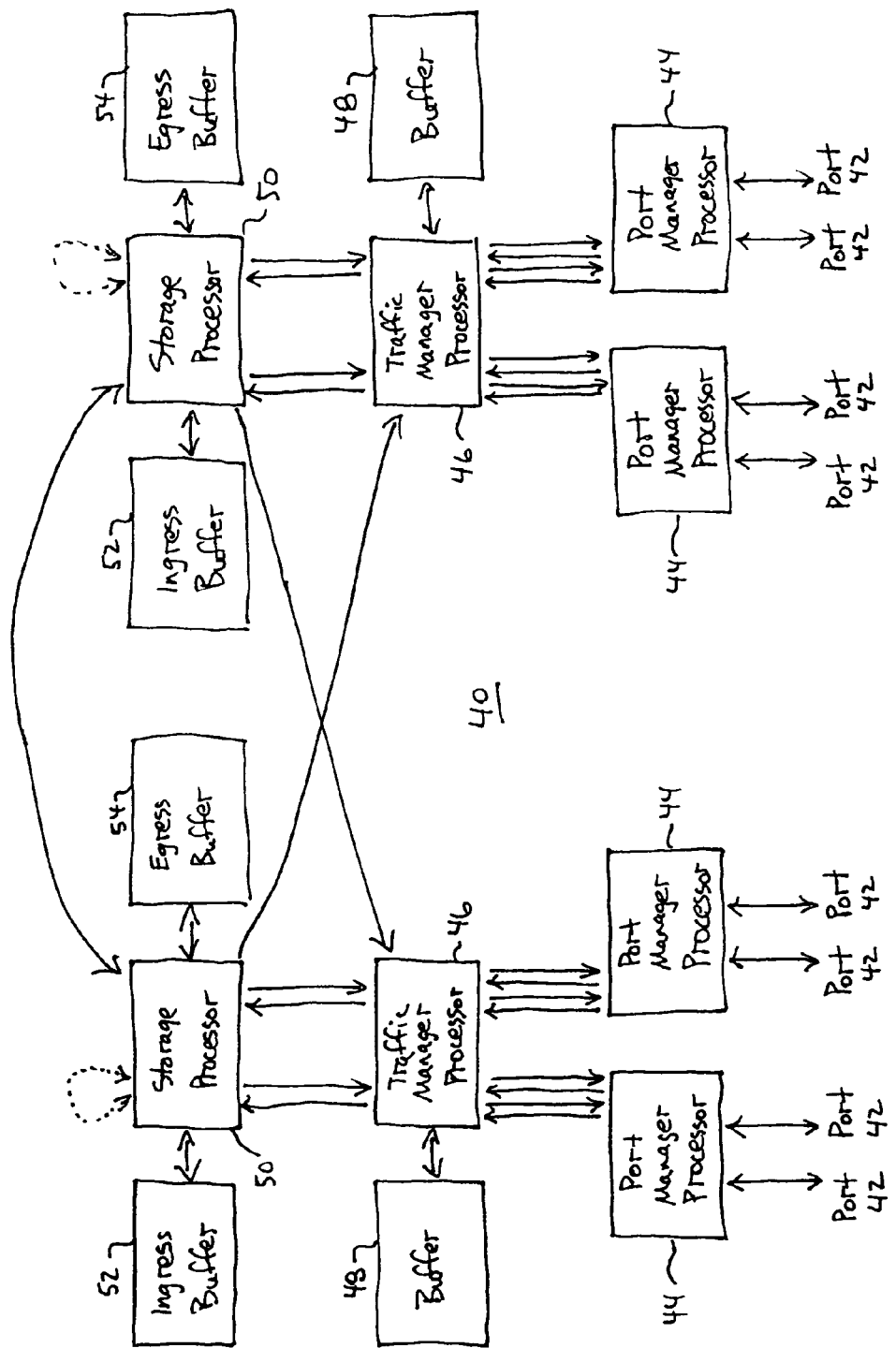
FIG. 2 is a block diagram of a storage server according to an embodiment of the present invention.

FIG. 2 is a block diagram of a storage server 40 according to an embodiment of the present invention. The storage server 40 includes ports 42, port manager processors 44, traffic manager processors 46, buffers 48, storage processors 50, ingress buffers 52, and egress buffers 54. The term "ingress" is associated with the data flowing into the storage server 40, that is, data flowing from a port 42 to a port manager processor 44 to a traffic manager processor 46 to a storage processor 50. (These components may also be referred to as "ingress" components, for example, the "ingress storage processor".) The data then flows out of the storage server 40, and the term "egress" is associated with the data flowing from a storage processor 50 to a traffic manager processor 46 to a port manager processor 44 to a port 42. (These components may also be referred to as "egress" components, for example, the "egress storage processor".) Note that the ingress components can be the same as the egress components, for example, when the ingress port 42 and the egress port 42 are both associated with the same storage processor 50. The arrows indicate the flow of data and flow control information, and other control signals. Although specific numbers of these components are shown according to the embodiment shown in FIG. 2, as well as referred to in the examples of its operation, it will be appreciated by one of ordinary skill in the art that the numbers may be varied according to various design criteria.

Figure 1:
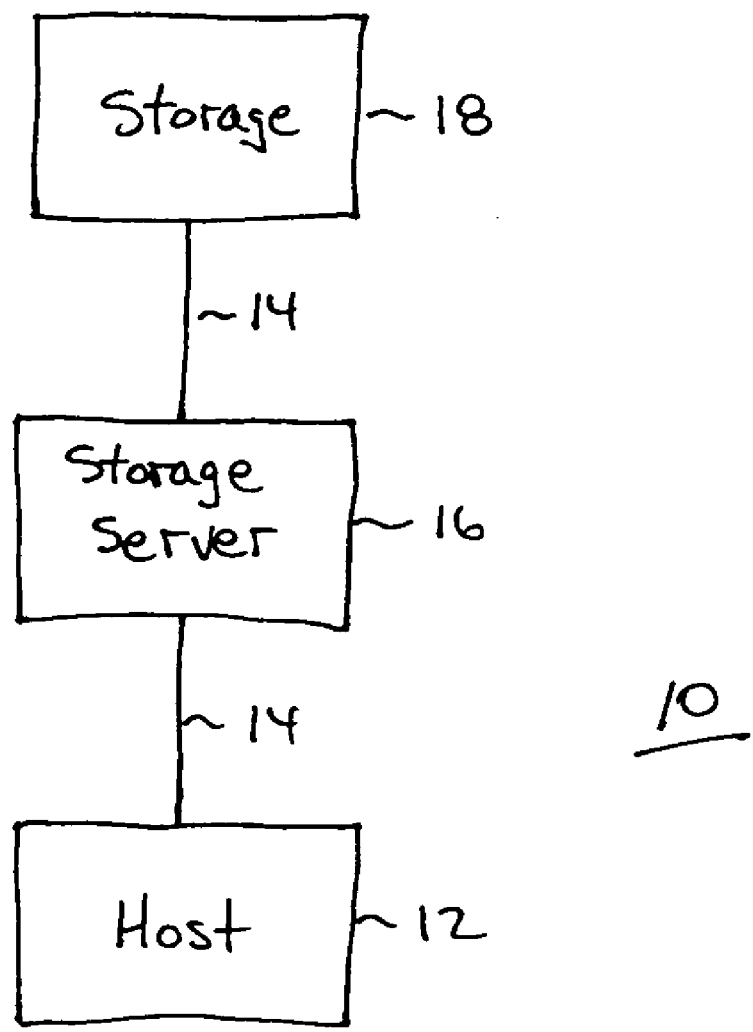
FIG. 1 is a block diagram of a prior art storage area network system.

The ports 42 according to one embodiment are eight in number and provide ingress and egress data access between the storage server 40 and a fibre channel network. Generally, the storage server 40 receives data at one of the ports 42 (termed the "ingress port") and routes it to another of the ports 42 (termed the "egress port"). For example, when a host wants to read data from a storage system, the ingress port couples to the storage system, and the egress port couples to the host. Similarly, when the host wants to write data to the storage system, the ingress port couples to the host, and the egress port couples to the storage system. The host and the storage system are coupled to the storage server 40 via the network (as in FIG. 1).

The port manager processors 44 according to one embodiment are four in number and provide an interface between the ports 42 and the traffic manager processors 46. In addition, according to one embodiment, the port manager processors translate data frames from a first format to a second format. For example, the first format may be a storage protocol (e.g., Fibre Channel) and the second format may be a network protocol (e.g., TCP/IP, Ethernet, SONET, Packet Over SONET [POS], etc.). The second format is used by the other components of the storage server 40.

The traffic manager processors 46 according to one embodiment are two in number and provide an interface between the port manager processors 44 and the storage processors 50. The traffic manager processor 46 can be viewed as a multiplexer between one of the storage processors 50 and its two associated port manager processors 44. The storage processor 50 need not worry about its two associated port manager processors 44 because the traffic manager processor 46 is handling the situation.

The buffers 48 according to one embodiment are each implemented as a component of and associated with one of the traffic manager processors 46. The buffer 48 stores ingress (and egress) data frames until the traffic manager processor forwards them on to the appropriate upstream (or downstream) component. According to one embodiment, the buffers 48 are 8 megabytes (MB).

The storage processors 50 according to one embodiment are two in number. The storage processors 50 are coupled together and are coupled to the traffic manager processors 46. According to one embodiment, the storage processors 50 are network processors and are configured to process traffic according to a network protocol (e.g., TCP/IP, Ethernet, SONET, POS, etc.).

The ingress buffers 52 and the egress buffers 54 according to one embodiment are each implemented as a component of and associated with one of the storage processors 50. The ingress buffer 52 stores ingress data frames prior to the frames being processed by the storage processor 50. The ingress buffer 52 may be relatively small, for example, having the capacity to store 128 kilobytes (KB). The egress buffer 54 stores egress data frames after the data frames have been processed by the storage server 50. The egress buffer 54 may be relatively large, for example, 64 megabytes (MB).

Each component is configured to be responsive to flow control signals and thereby control the flow of data. In addition, the storage processors 50 execute a computer program that monitors the flow of data in the storage server 40 and takes additional steps to control the components to further control the flow of data. The following paragraphs describe the basic flow control mechanisms of each component. After the basic flow control mechanisms have been described, a specific example of the flow control operation is given with reference to FIG. 3.

Port Manager Processor 44

In the egress direction, the port manager processor 44 may perform frame-based flow control or cycle-based flow control, as desired. Cycle-based flow control can be more precise under certain circumstances and is generally preferred. Frame-based flow control can be wasteful in terms of buffering capacity, but has the potential advantage of guaranteeing that full frames are transferred between components. Either method can be implemented by the port manager processor 44 to support the method described. Egress flow control is initiated by the port manager processor 44 when its internal data structures cannot store any more data. This buffer exhaustion condition can be caused either by congestion on an egress port 42 or be due to flow control back pressure on the network.

In the ingress direction, the port manager processor 44 is responsive to a signal from the associated traffic manager processor 46. According to one embodiment, this signal is the RX_ENB signal on a POS-PHY3 interface between the devices. When this signal is asserted, the port manager processor 44 will start buffering ingress packets.

Traffic Manager Processor 46

In the egress direction, the traffic manager processor 46 uses the associated buffer 48 to temporarily store frames in the event of short-term congestion on an associated port manager processor 44. The buffers are assigned on a per output port basis. Thus, frames need only be buffered for the ports that are congested. Any frames destined for non-congested ports continue to be forwarded. The traffic manager processor 46 will de-assert a signal to the associated storage processor 50 if there are no more buffers available to store data for a congested port. According to one embodiment, this signal is the TxPFA signal and causes the storage processor 50 to stop sending data to the traffic manager processor 46.

In the ingress direction, the traffic manager processor 46 uses the associated buffer 48 to temporarily store ingress frames prior to sending them to the associated storage processor. According to one embodiment, the ingress interface to the storage processor 50 is 2× oversubscribed, so the temporary storage allows for brief periods of over-subscription. The storage processor 50 de-asserts a signal to the traffic manager processor 44 when there are no buffers available for more data from the traffic manager processor 44. According to one embodiment, this signal is the RX_ENB signal.

In addition, the traffic manager processor 46 provides a queue status message in-band to the computer program running on the storage processor 50. This message contains the fill level of all the queues in the traffic manager processor 46 and allows the computer program to take pre-emptive action to prevent frame discard due to buffer exhaustion.

Storage Processor 50

In the egress direction, the storage processor 50 uses its egress buffer 54 to store egress frames. There may be several buffer threshold settings to aid in the detection of congestion. One of these settings may be communicated to the other storage processors 50 in the storage server 40 using a remote egress status bus. The ingress storage processor 50 may use the information received on the remote egress status bus to implement pre-emptive flow control.

In the ingress direction, the storage processor 50 uses its ingress buffer 52 to store ingress frames. A threshold setting for the ingress buffer may generate an out-of-band flow control signal to the associated traffic manager processor 46 indicating to the traffic manager processor 46 to stop sending data to the storage processor 50 and to start buffering frames instead.

Figure 3:
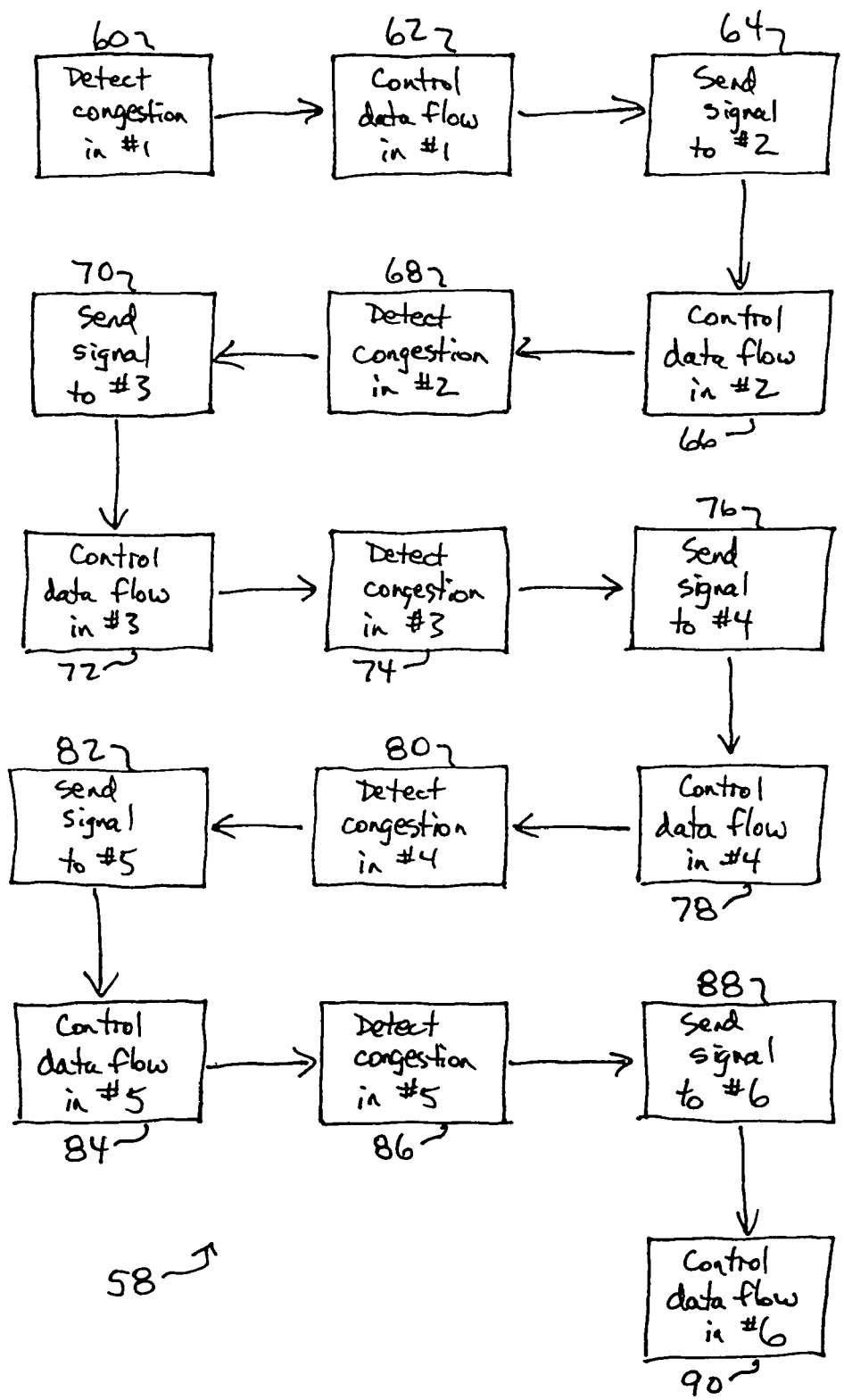
FIG. 3 is a flow diagram of a method according to an embodiment of the present invention performed by the storage server of FIG. 2.

FIG. 3 is a flow diagram of a method 58 according to an embodiment of the present invention performed by the storage server of FIG. 2. A generic description is first provided, then the details follow. The phrase "upstream component" refers a component that is the immediately previous source of the data flow. The phrase "downstream component" refers to a component that is the immediately following destination of the data flow.

In step 60, a first component of the storage server 40 detects congestion. As one example, the port manager processor 44 may detect egress congestion on one of its downstream ports 42. In step 62, the first component controls the data flow therethrough. In step 64, the first component sends a signal to a second component of the storage server 40. As one example, the port manager processor 44 sends a signal to its upstream traffic manager processor 46.

In step 66, the second component controls the data flow therethrough. As one example, the traffic manager processor stores data frames in its buffer 48. In step 68, the second component of the storage server 40 detects congestion. As one example, the traffic manager processor 46 may detect that its buffer 48 is getting full. In step 70, the second component sends a signal to a third component of the storage server 40. As one example, the traffic manager processor 46 sends a signal to its upstream storage processor 50.

In step 72, the third component controls the data flow therethrough. As one example, the storage processor 50 stores data frames in its egress buffer 54. In step 74, the third component of the storage server 40 detects congestion. As one example, the storage processor 50 may detect that its egress buffer 54 is getting full. In step 76, the third component sends a signal to a fourth component of the storage server 40. As one example, the storage processor 50 sends a signal to the storage processor 50 that is further upstream.

In step 78, the fourth component controls the data flow therethrough. As one example, the upstream storage processor 50 stores data frames in its egress buffer 54. In step 80, the fourth component of the storage server 40 detects congestion. As one example, the upstream storage processor 50 may detect that its egress buffer 54 is getting full. In step 82, the fourth component sends a signal to a fifth component of the storage server 40. As one example, the upstream storage processor 50 sends a signal to its upstream traffic manager processor 46.

In step 84, the fifth component controls the data flow therethrough. As one example, the upstream traffic manager processor 46 stores data frames in its buffer 48. In step 86, the fifth component of the storage server 40 detects congestion. As one example, the upstream traffic manager processor 46 may detect that its buffer 48 is getting full. In step 88, the fifth component sends a signal to a sixth component of the storage server 40. As one example, the upstream traffic manager processor 46 sends a signal to an upstream port manager processor 44. In step 90, the sixth component controls the data flow therethrough. As an example, the upstream port manager processor stops accepting data frames from the ingress port 42 that is the source of the data flow.

Figure 4:
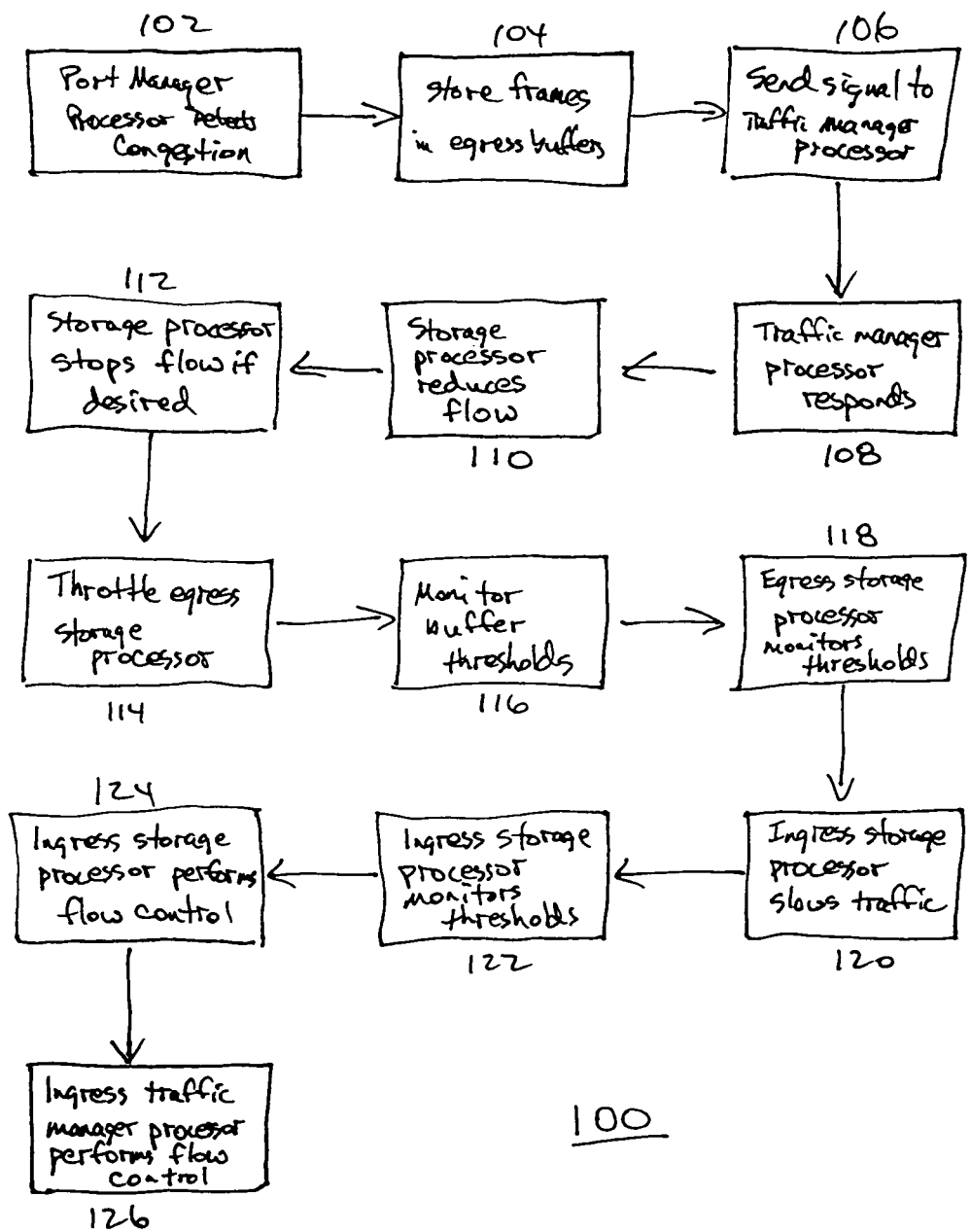
FIG. 4 is a flow diagram of a method of controlling egress congestion according to an embodiment of the present invention performed by the storage server of FIG. 2.

FIG. 4 is a flow diagram of a method 100 for controlling egress congestion according to an embodiment of the present invention performed by the storage server of FIG. 2.

In step 102, one of the port manager processors 44 detects congestion on one of the egress ports 42. The congestion may result from congestion on the fibre loop or due to backpressure received across the Fibre Channel in certain network implementations. (Such congestion need not result from a fibre down condition, as that is an error condition and may be handled in other ways.) Most of the time the congestion is temporary; that is, it will be relieved at some point in the future. The longer the congestion lasts, the farther back into the storage server 40 the condition is realized. One objective of flow control according to an embodiment of the present invention is to push the congestion back through the storage server 40, component by component, until the congestion is recognized at the ingress ports without dropping frames. Should the congestion last long enough, there may be no choice but to drop frames, but that should be a last resort solution.

In step 104, since frames cannot get onto the fibre, the frames are backed up into the egress buffers of the port manager processor 44.

In step 106, at a point defined by a programmable threshold, the port manager processor 44 sends a signal to its associated upstream (egress) traffic manager processor 46. According to one embodiment, this signal is the de-assertion of the TX_DFA signal that identifies the congested port.

In step 108, the egress (upstream) traffic manager processor 46 detects the signal from the port manager processor 44, and the associated egress queue starts to grow. The egress traffic manager processor 46 continues to forward frames that are destined for the other, non-congested downstream ports 42. The egress traffic manager processor 46 sends a queue status frame to the associated upstream (egress) storage processor 50 that indicates that the egress queue is growing.

In step 110, the egress (upstream) storage processor examines the queue status frame. At a programmable threshold, the computer program running on the egress storage processor 50 throttles the congested port. According to one embodiment, throttling is implemented by reducing the amount of bandwidth allocated to the port in the scheduler of the egress storage processor 50.

In step 112, if the egress queue continues to grow, the computer program running on the egress storage processor 50 stops forwarding any frames destined for the congested port. According to one embodiment, this is accomplished by setting the allocated bandwidth in the scheduler to zero. Otherwise, at some point, the egress traffic manager processor 46 will experience egress buffer exhaustion.

In step 114, when the egress buffers are exhausted, the egress traffic manager processor 46 may throttle the egress (upstream) storage processor 50 by sending a signal. According to one embodiment, this signal is the TXPFA signal. The TxPFA signal stops the flow of traffic to all the egress ports 42 associated with that egress storage processor 50, not just the congested port 42.

In step 116, assuming that the computer program running in the egress storage processor 50 successfully slows or stops the flow of traffic to the congested port 42, the egress buffers in the egress data store 54 will begin to be consumed by frames destined for the congested port 42. One goal is to avoid dropping frames, which is promoted by monitoring various thresholds and not allowing them to be exceeded. According to one embodiment, two thresholds to monitor are the FQ_Threshold_0 threshold and the P0/P1 Twin Count threshold.

In step 118, the egress storage processor 50 monitors a number of features that may be used to help alleviate egress buffer exhaustion. The computer program running on the egress storage processor 50 may control these features, such as the FQ_Threshold_1 threshold and the Egress P0/P1 Twin Count EWMA threshold. The Egress P0/P1 Twin Count EWMA threshold can be used to transmit the status of the egress buffer store 52 to the ingress (upstream) storage processor 50 via the remote egress status bus.

In step 120, if either of these thresholds is violated, the ingress storage processor 50 may detect it by polling a register in the control access bus (CAB). If the FQ_Threshold_1 threshold is violated, an interrupt is generated in the affected storage processor 50. In either case, the ingress storage processor 50 slows the forwarding of traffic to the congested egress storage processor 50 before egress buffer exhaustion occurs, as that would result in frame discard.

One way the ingress storage processor 50 can prevent egress buffer exhaustion is to deny new input/output (I/O) requests from being initiated. In this case, the ingress (upstream) storage processor 50 would respond with a "busy" signal to any new I/O requests. This may not totally prevent buffer exhaustion, however, since in-progress I/Os need to be completed. To completely shut down the flow of traffic to the congested (egress) storage processor 50, the ingress storage processor 50 may stop forwarding frames to the egress storage processor 50. According to one embodiment, the computer program in the ingress storage processor 50 turns on the SDM_A/B_BkPr bits, effectively disabling the ingress storage processor 50 from forwarding any traffic.

In step 122, once the flow of traffic to the egress storage processor 50 is stopped, the ingress data store buffers 52 begin to fill. To prevent the exhaustion of the ingress buffers 52, the ingress storage processor 50 monitors various thresholds. According to one embodiment, the computer program in the ingress storage processor 50 sets the Ingress Free Queue Threshold (FQ_SBFQ_Th) so that this threshold is violated before buffer exhaustion occurs. When this threshold is violated, the I_Free_Q_Th signal is asserted to the ingress traffic manager processor 46.

In step 124, in response to the signal from the ingress storage processor 50, the ingress traffic manager processor 46 stops forwarding traffic to the ingress storage processor 50 and starts a periodic flow control of the ingress port manager processor 44.

In step 126, should the ingress buffers 48 in the ingress traffic manager processor 46 become exhausted, the ingress traffic manager processor 46 may hard flow control the ingress port manager processor 44 to completely stop the ingress flow of data. The ingress port manager processor 44, in response, stops accepting frames from the fibre.

Once the egress data congestion is relieved, the whole process is performed in reverse to get ingress frames flowing again.

In addition to the flow control features described above, the storage server 40 includes some additional flow control features. One such feature is that the storage processor 50 is configured to send an out-of-band signal to the opposite traffic manager processor 46. (The term "opposite" refers to the traffic manager processor 46 associated with a storage processor 50 other than the storage processor 50 at issue.) The out-of-band signal may be generated by the computer program running on the storage processor 50. In the case of the egress congestion, the out-of-band signal instructs the opposite traffic manager processor 46 to control the ingress data flow. In such a manner, the egress storage processor 50 can work to control the data flow in some cases prior to the ingress storage processor 50 being aware that congestion exists.

Figure 5:
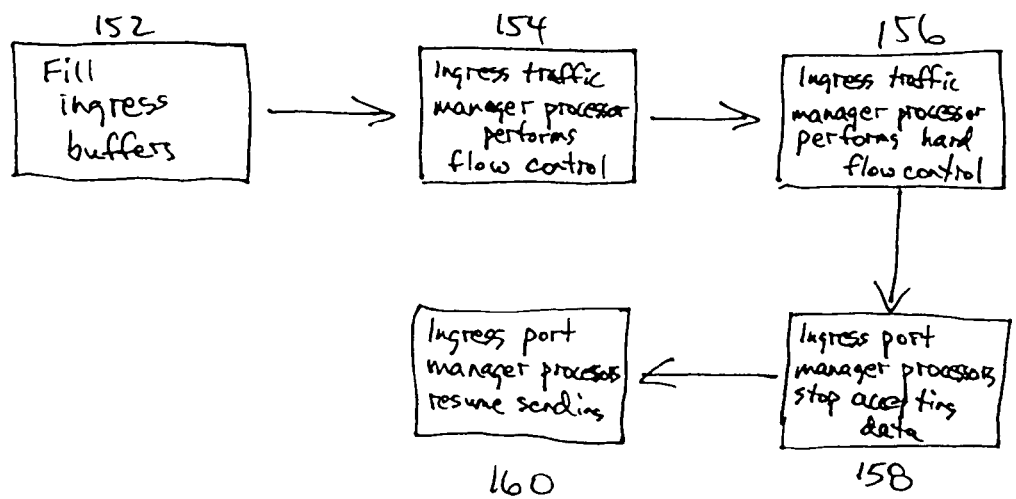
FIG. 5 is a flow diagram of a method of controlling ingress congestion according to an embodiment of the present invention performed by the storage server of FIG. 2.

FIG. 5 is a flow diagram of a method 150 for controlling ingress congestion according to an embodiment of the present invention performed by the storage server of FIG. 2. Ingress congestion can occur in two instances: as an eventual result of egress congestion, and as a result of over-subscription.

First, regarding ingress congestion resulting from egress congestion, the steps are similar to those described above regarding FIG. 4 and are not repeated.

Second, regarding ingress congestion resulting from data over-subscription, in step 152, the ingress buffers 48 of the ingress traffic manager processor 46 begin to fill. In step 154, once the buffers reach a defined threshold, the ingress traffic manager processor 46 starts periodic flow control of the associated ingress port manager processors 44 in order to slow the flow of ingress data. In step 156, if the ingress buffers 48 are exhausted, the ingress traffic manager processor 46 hard flow controls the ingress data from the associated ingress port manager processors 44. In step 158, the ingress port manager processors 44, in response, stop accepting frames from the fibre. In step 160, once ingress buffers are freed in the ingress traffic manager processor 46, the ingress port manager processors 44 are released to resume sending traffic to the ingress traffic manager processor 46.

Although the above description has focused on specific embodiments, various modifications and additions may be performed without departing from the scope of the present invention, which is defined by the following claims.

What is claimed is:

1. A method of controlling data flow to reduce congestion in a server having
   a plurality of ports including a plurality of ingress ports and a plurality of egress ports, comprising the steps of:
   detecting first congestion in a first data flow through a first component of said server, wherein said first component is coupled to one of said plurality of ports;
   controlling said first data flow through said first component in response to said first congestion;
   sending a first signal from said first component to a second component of said server in response to said first congestion;

controlling a second data flow through said second component in response to said first signal;

detecting second congestion in said second data flow by said second component;

sending a second signal from said second component in response to said second congestion; and controlling a third data flow through said third component in response to said second signal by communicating through an out-of-band signal to an opposite second component carrying data flow contributing to said third congestion wherein the out-of-band signal instructs the opposite second component to control the corresponding data flow associated with said opposite second component.

2. An apparatus including a server for reducing data flow congestion when processing data between a plurality of devices connected via a network, said server comprising:

a plurality of ports configured for ingress and egress of a plurality of data frames having a first format;

a plurality of port manager processors, coupled to said plurality of ingress ports and said plurality of egress ports, said plurality of port manager processors being configured to translate said plurality of data frames between said first format and a second format, said plurality of port manager processors being further configured to detect first congestion and to control a first data flow of said plurality of data frames when said first congestion is detected;

a plurality of traffic manager processors, coupled to said plurality of port manager processors, said plurality of traffic manager processors being configured to communicate said plurality of data frames with associated ones of said plurality of port manager processors, said plurality of traffic manager processors being further configured to detect second congestion and to control a second data flow of said plurality of data frames when said second congestion is detected; and a plurality of storage processors coupled together and coupled to said plurality of traffic manager processors, said plurality of storage processors being configured to direct said plurality of data frames according to an associated ingress port and an associated egress port of said plurality of ports, said plurality of storage processors being further configured to detect third congestion and to control a third data flow of said plurality of data frames when said third congestion is detected by communicating through an out-of-band signal to an opposite traffic manager processor carrying data flow contributing to said third congestion wherein the out-of-band signal instructs the opposite traffic manager to control the corresponding data flow associated with said opposite traffic manager.

3. The apparatus of claim 2, wherein said network comprises a Fibre Channel network.

4. The apparatus of claim 2, wherein said first format comprises a Fibre Channel format.

5. The apparatus of claim 2, wherein said plurality of ports comprises eight Fibre Channel ports, said plurality of port manager processors comprises four port manager processors, said plurality of traffic manager processors comprises two traffic manager processors, and said plurality of storage processors comprises two storage processors.

6. The apparatus of claim 2, wherein said second format comprises a Packet Over Synchronous Optical Network (SONET) (POS) format.

7. The apparatus of claim 2, wherein one of said plurality of data frames travels in an ingress direction via one of said plurality of ports, then via one of said plurality of port manager processors, then via one of said traffic manager processors, then via one of said plurality of storage processors.

8. The apparatus of claim 2, wherein one of said plurality of data frames travels in an egress direction via one of said plurality of storage processors, then via one of said traffic manager processors, then via one of said plurality of port manager processors, then via one of said plurality of ports.

9. The apparatus of claim 2, wherein said first congestion comprises ingress congestion, wherein one of said plurality of port manager processors detects said ingress congestion via a signal from an associated one of said plurality of traffic manager processors, and wherein said one of said plurality of port manager processors controls said first data flow by buffering packets of said plurality of data frames.

10. The apparatus of claim 2, wherein said first congestion comprises egress congestion, wherein one of said plurality of port manager processors sends a signal to an associated one of said plurality of traffic manager processors, and wherein said associated one of said plurality of traffic manager processors controls said second data flow in response to said signal.

11. The apparatus of claim 2, further comprising:

a plurality of buffers, coupled to said plurality of traffic manager processors, configured to buffer one or more of said plurality of data frames when said second congestion is detected.

12. The apparatus of claim 2, wherein said second congestion comprises ingress congestion, wherein one of said plurality of traffic manager processors sends a signal to an associated one of said plurality of port manager processors, and wherein said associated one of said plurality of port manager processors controls said first data flow in response to said signal.

13. The apparatus of claim 2, wherein said second congestion comprises egress congestion, wherein one of said plurality of traffic manager processors sends a signal to an associated one of said plurality of storage processors, and wherein said associated one of said plurality of storage processors controls said third data flow in response to said signal.

14. The apparatus of claim 2, wherein one of said plurality of traffic manager processors sends a queue status message to an associated one of said plurality of storage processors, and said associated one of said plurality of storage processors controls said third data flow in response to said queue status message.

15. The apparatus of claim 2, wherein said third congestion comprises ingress congestion, wherein one of said plurality of storage processors sends a first signal to an associated one of said plurality of traffic manager processors, wherein said associated one of said plurality of traffic manager processors controls said second data flow in response to said first signal and sends a second signal to an associated one of said plurality of port manager processors, and wherein said associated one of said plurality of port manager processors controls said first data flow in response to said second signal.

16. The apparatus of claim 2, wherein said third congestion comprises egress congestion, wherein a first one of said plurality of storage processors sends a signal to a second one of said plurality of storage processors, and wherein said second one of said plurality of storage processors controls said third data flow in response to said signal.

17. The apparatus of claim 2, wherein one of said plurality of storage processors includes:

an egress buffer configured to buffer one or more of said plurality of data frames when said third congestion, corresponding to egress congestion, is detected.

18. The apparatus of claim 2, wherein one of said plurality of storage processors includes:
   an ingress buffer configured to buffer one or more of said plurality of data frames when said third congestion, corresponding to ingress congestion, is detected.

19. The apparatus of claim 2, wherein one of said plurality of storage processors executes a computer program that controls said one of said plurality of storage processors to control said third data flow and to send congestion information to another of said plurality of storage processors.

* * * * *